US012534329B2

(12) United States Patent
Steiner et al.

(10) Patent No.: US 12,534,329 B2
(45) Date of Patent: Jan. 27, 2026

(54) SHEET PROCESSING MACHINE

(71) Applicant: BOBST MEX SA, Mex (CH)

(72) Inventors: Maude Steiner, Morrens (CH); Daniel Tapis, Crissier (CH)

(73) Assignee: Bobst Mex SA, Mex (CH)

( * ) Notice: Subject to any disclaimer, the term of this patent is extended or adjusted under 35 U.S.C. 154(b) by 192 days.

(21) Appl. No.: 18/248,772

(22) PCT Filed: Oct. 6, 2021

(86) PCT No.: PCT/EP2021/077540
§ 371 (c)(1),
(2) Date: Apr. 12, 2023

(87) PCT Pub. No.: WO2022/084038
PCT Pub. Date: Apr. 28, 2022

(65) Prior Publication Data

US 2023/0406660 A1 Dec. 21, 2023

(30) Foreign Application Priority Data

Oct. 21, 2020 (EP) .................................... 20203077

(51) Int. Cl.

| | |
|---|---|
| ***B65H 43/08*** | (2006.01) |
| ***B26D 5/00*** | (2006.01) |
| ***B65H 31/32*** | (2006.01) |
| ***F16P 3/14*** | (2006.01) |

(52) U.S. Cl.
CPC ............. *B65H 43/08* (2013.01); *B26D 5/007* (2013.01); *B65H 31/32* (2013.01); *F16P 3/144* (2013.01); *B65H 2511/40* (2013.01); *B65H 2511/528* (2013.01); *B65H 2553/412* (2013.01); *B65H 2553/416* (2013.01); *B65H 2557/63* (2013.01)

(58) Field of Classification Search
CPC ........ B65H 31/32; B65H 43/00; B65H 43/08; B65H 2511/40; B65H 2511/528; B65H 2553/40; B65H 2553/41; B65H 2553/412; B65H 2553/416; B65H 2557/63; B26D 5/007; F16P 3/144
See application file for complete search history.

(56) References Cited

U.S. PATENT DOCUMENTS

| | | | |
|---|---|---|---|
| 3,815,895 | A | 6/1974 | Dufour |
| 4,112,379 | A | 9/1978 | Schmidt |
| 4,307,957 | A | 12/1981 | Kitagawa et al. |

(Continued)

FOREIGN PATENT DOCUMENTS

| | | | |
|---|---|---|---|
| CN | 202558364 | U | 11/2012 |
| CN | 108188252 | A | 6/2018 |

(Continued)

*Primary Examiner* — Prasad V Gokhale
(74) *Attorney, Agent, or Firm* — Bookoff McAndrews, PLLC

(57) ABSTRACT

A sheet processing machine (10) with a jam detection device (44, 46), the jam detection device (44, 46) comprising a light emitting element and a light receiving element forming a light barrier in a detection zone (53, 78) of a processing station of the sheet processing machine (10). The jam detection device (44, 46) further comprises a control unit (48) being connected to the light receiving element and being adapted to register if the light barrier is interrupted.

10 Claims, 3 Drawing Sheets

(56) References Cited

U.S. PATENT DOCUMENTS

Figure 1:
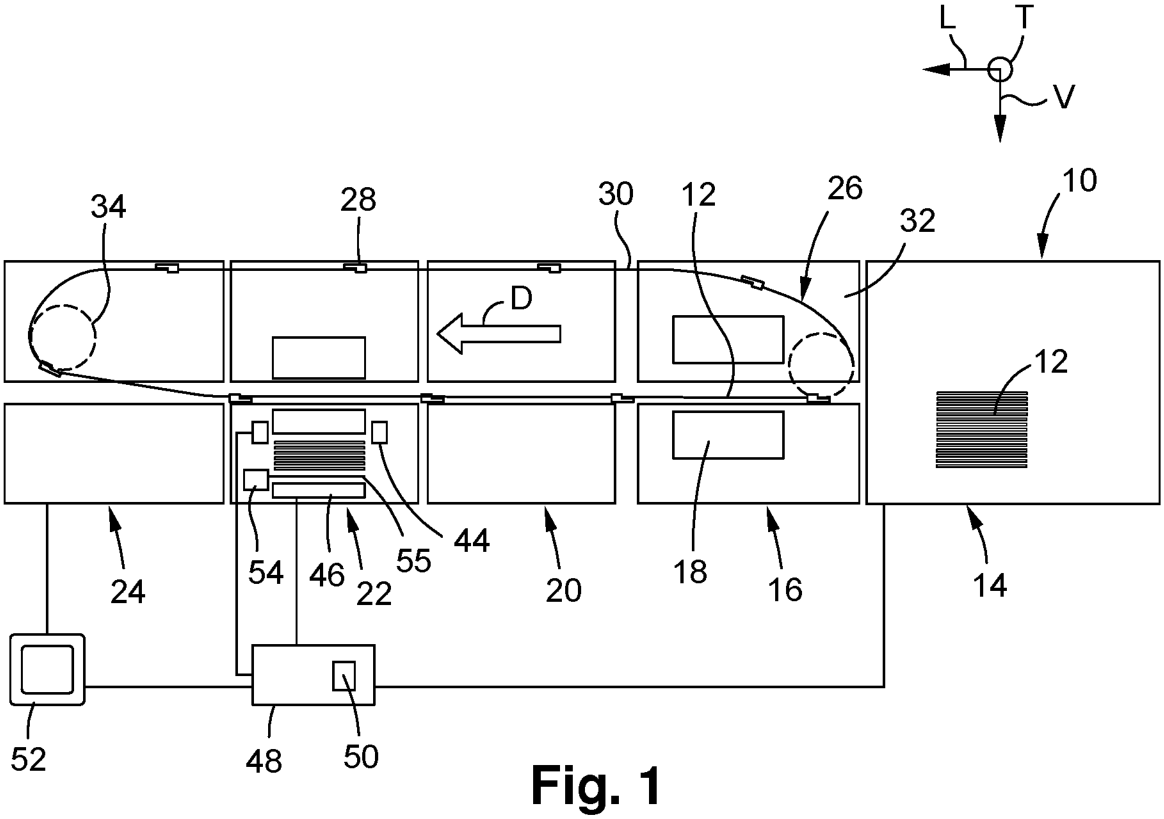

| | | | | |
|---|---|---|---|---|
| 5,243,183 | A | 9/1993 | Barron, Jr. et al. | |
| 5,486,691 | A * | 1/1996 | Dieterle | G02B 26/10 250/221 |
| 5,595,560 | A | 1/1997 | Kamada | |
| 6,259,867 | B1 | 7/2001 | Park et al. | |
| 6,718,225 | B2 | 4/2004 | Nicole | |
| 7,009,720 | B1 * | 3/2006 | Williams | B65H 29/60 358/1.12 |
| 2004/0108644 | A1 | 6/2004 | Obregon et al. | |
| 2007/0012204 | A1 | 1/2007 | Sato | |
| 2007/0163414 | A1 | 7/2007 | Senda et al. | |
| 2007/0251192 | A1 | 11/2007 | Fairweather et al. | |
| 2008/0122166 | A1 | 5/2008 | Fukube | |
| 2014/0084536 | A1 * | 3/2014 | Matos | B65H 31/02 271/145 |
| 2014/0231507 | A1 | 8/2014 | O'brien et al. | |
| 2016/0203232 | A1 | 7/2016 | O'brien et al. | |
| 2018/0039807 | A1 | 2/2018 | Obrien et al. | |
| 2019/0152181 | A1 | 5/2019 | Paubel et al. | |
| 2021/0122131 | A1 | 4/2021 | Chatry | |
| 2022/0169464 | A1 * | 6/2022 | Shimada | B65H 7/14 |

FOREIGN PATENT DOCUMENTS

| | | | |
|---|---|---|---|
| CN | 208561192 | U | 3/2019 |
| CN | 111474835 | A | 7/2020 |
| DE | 19944581 | C1 | 12/2000 |
| DE | 19933287 | A1 | 1/2001 |
| DE | 202016102593 | U1 | 6/2016 |
| EP | 0600672 | A2 | 6/1994 |
| EP | 0927600 | A1 | 7/1999 |
| EP | 1069062 | A2 | 1/2001 |
| EP | 1445660 | A2 | 8/2004 |
| EP | 2354059 | A2 | 8/2011 |
| EP | 3686139 | A1 | 7/2020 |
| GB | 2185130 | A | 7/1987 |
| JP | S5785182 | A | 5/1982 |
| JP | S62227776 | A | 10/1987 |
| JP | 2000233847 | A | 8/2000 |
| JP | 2001316026 | A | 11/2001 |
| JP | 2003238017 | A | 8/2003 |
| JP | 2005001779 | A | 1/2005 |
| JP | 2007021913 | A | 2/2007 |
| JP | 2020517945 | A | 6/2020 |
| TW | 201707924 | A | 3/2017 |
| WO | 2016175057 | A1 | 11/2016 |

* cited by examiner

SHEET PROCESSING MACHINE

The invention relates to a sheet processing machine with a jam detection device.

CROSS-REFERENCE TO RELATED APPLICATION(S)

This application is a National Stage Application under 35 U.S.C. § 371 of International Application No. PCT/EP2021/077540, filed Oct. 6, 2021, which claims priority to European Application No. 20203077.1, filed on Oct. 21, 2020, the entireties of which are incorporated herein by reference.

Sheet processing machines, also known as converting machines, are used in the packaging industry for processing raw materials, e.g. cardboard, paper or foils, into intermediate or finished products, typically in the form of sheets. Converting operations can e.g. include printing, cutting, creasing, blanking, stamping and/or folding-gluing. Typically, the individual operations are done in subsequent processing stations of the sheet processing machine with the sheets being conveyed from one processing station to the subsequent one by a transfer mechanism. The sheets can be collected in vertical stacks after converting in a designated piling area of the sheet processing machine.

Modern sheet processing machines enable a high throughput of sheets, i.e. a high processing speed. However, high processing speeds increase the risk that sheets or pieces of sheets get jammed in one of the processing stations of the sheet processing machine. E.g., blanking operations involve breaking nicks in sheets by blanking tools, wherein the nicks have been formed in a previous processing step, thereby pushing the blanks downwards into a piling area for collecting the blanks. If a sheet or any of the blanks gets jammed in the blanking tools or in the piling area, further operation of the processing machine can lead to production of a whole batch of damaged blanks or at least of blanks with only reduced quality.

The object of the invention is to provide a means for reliably detecting jams in a processing machine. Preferably, the means should be simple and cheap.

US 2007/012204 discloses a jams detection system at the output of a rotary printer by having two light rays detecting the front of a sheet and a system that checks the proper traveling schedule of the sheet to detect possible jams. It does not use a light curtain.

The object of the invention is solved by a sheet processing machine with a jam detection device, the jam detection device comprising a light emitting element and a light receiving element forming a light barrier in a detection zone of a processing station of the sheet processing machine. The jam detection device further comprises a control unit being connected to the light receiving element and being adapted to register if the light barrier is interrupted.

A light barrier is a simple and cost-effective option for detecting whether any sheet, blank or parts thereof are present in the detection zone along the light barrier. Further, the signal received from the light receiving element is a reliable quantity to be measured.

Additionally, response times of the light receiving elements can be sufficiently low to differentiate between an interruption of the light barrier due to normal operation of the sheet processing machine, e.g. blanks being pushed through the detection zone in a blank separation station, and interruptions due to a jammed sheet, blank and/or pieces thereof. Specifically, a jammed sheet, blank and/or piece thereof is expected to interrupt the light barrier for a time duration much longer than a sheet or blank passing the detection zone during normal operation of the sheet processing machine.

The light barrier formed in the detection zone by the light emitting element and the light receiving element is a light curtain comprising more than one light rays, the control unit being adapted to register if one or more of the light rays is interrupted.

In this case the light emitting element comprises more than one light emitting source and the light receiving element comprises more than one light receiving sensor, wherein each light receiving sensor is associated to one of the light emitting sources.

The light curtain allows the control unit to register any interruption of the light curtain in a spatially resolved manner. With other words, the control unit can obtain spatially resolved information about any objects within the detection zone.

Depending on the number of light emitting sources and the number of light receiving sensors, the size of the detection zone and the spacing between the associated pairs of light emitting sources and light receiving sensors, the light curtain can be an essentially continuous light curtain.

To enhance the reliability of the jam detection device, the light curtain can extend over at least 80% of the width of the detection zone, especially over at least 90% of the width of the detection zone. Preferably, the light curtain extends over essentially the full width of the detection zone to ensure that no sheet, blank and/or piece thereof can be present in the detection zone without being registered by the control unit.

To provide a simple arrangement for aligning the light emitting element and the light receiving element, the light receiving element and the light emitting element can be mounted on a first rail and a second rail, respectively, the first rail and the second rail especially being parallel to each other.

In a variant, the detection zone is arranged underneath a rack for collecting sheets or blanks processed by the sheet processing machine.

The rack can be a non-stop rack, also denoted "non-stop". Such non-stop racks typically comprise a series of retractable bars, also known as "swords", which are laterally spaced apart of each other. Due to the resulting spacing between the retractable bars, there is a risk that a sheet or blank supposed to pile up on the non-stop rack gets jammed between the retractable bars. The jam detection device can register the interruption of the light barrier in this case, if the detection zone is underneath the rack. With other words, the jam detection device can monitor if the sheets or blanks are properly arranged on the rack.

The processing station can comprise a tool being at least partially arranged in the detection zone, wherein the control unit comprises a storage module for storing information about the tool.

The risk for an object becoming jammed is higher at the tool of the processing station, as the tool is interacting with the sheet being processed in the sheet processing machine. Any misalignment and/or malfunction of the tool might therefore be a reason for a sheet, blank or piece thereof to become jammed in the sheet processing machine.

Preferably, the information about the tool comprises a ray blocking map, the ray blocking map indicating if the light barrier is interrupted by the tool, especially if one or more of the light rays are interrupted by the tool.

With other words, the ray blocking map is representative for the geometry of the part of the tool being arranged in the detection zone. As the control unit is aware of the geometry of the tool based on the ray blocking map, interruptions of the light barrier, especially of one or more of the light rays, merely resulting from the presence of the tool, can easily be identified by the control unit. This allows to reliably differentiate between an interruption coming from the tool and an interruption coming from an object being jammed in the detection zone.

To enable the control unit to differentiate between different tools, the information about the tool can include a tool identifier.

The tool identifier can be determined by scanning a tag, e.g. an RFID tag, a barcode and/or a QR-code.

The jam detection device can comprise a detection means adapted for scanning the type of tag used for the tool.

Tools used in sheet processing machines typically must be changed between different processing jobs to be suitable for the necessary converting operations of the respective processing job. By providing a tool identifier for each tool used, the control unit can automatically identify the ray blocking map stored in the storage module with the associated tool.

To ensure that for each tool used in the processing station an associated ray blocking map is available, the control unit can be adapted to automatically determine the ray blocking map of the tool if the tool identifier is not already stored in the storage module with an associated ray blocking map.

This means that the control unit can automatically determine the ray blocking map without any intervention by an operator of the sheet processing machine, wherein the prior unknown tool identifier becomes associated to the determined ray blocking map.

For obtaining the information about the tool, the control unit can be adapted to enter into a learning mode. Preferably, the automatic determination of the ray blocking map is done in the learning mode.

The tool is especially a blanking tool. During blanking operations, the risk of an object becoming jammed in the corresponding blank separation station is especially high, as blanks must be successfully separated from the processed sheets. Therefore, monitoring the correct function of the blanking tool is especially suited to prevent interruptions in the operation of the sheet processing machine.

To provide the operator of the sheet processing machine with information about the current state of the sheet processing machine, the sheet processing machine can comprise a human-machine-interface connected to the control unit, e.g. a touch-sensitive display.

Preferably, the control unit is adapted to transmit a warning message to the human-machine-interface if the light barrier is interrupted, especially wherein the warning message is transmitted only if the interruption of the light barrier does not correspond to the ray blocking map of the tool stored in the storage module.

The warning message can also include the exact position of the interrupted light barrier in the detection zone to ease the identification of the object jammed in the detection zone.

The tool information, especially the tool identifier, can be displayed on the human-machine-interface to allow the operator to check that the correct tool is installed. The tool identifier can be supplied by the operator and transmitted to the control unit, too.

Further, a message can be displayed on the human-machine-interface when the control unit is in the learning mode to inform the operator that additional information on the installed tool needs to be obtained.

Figure 2:
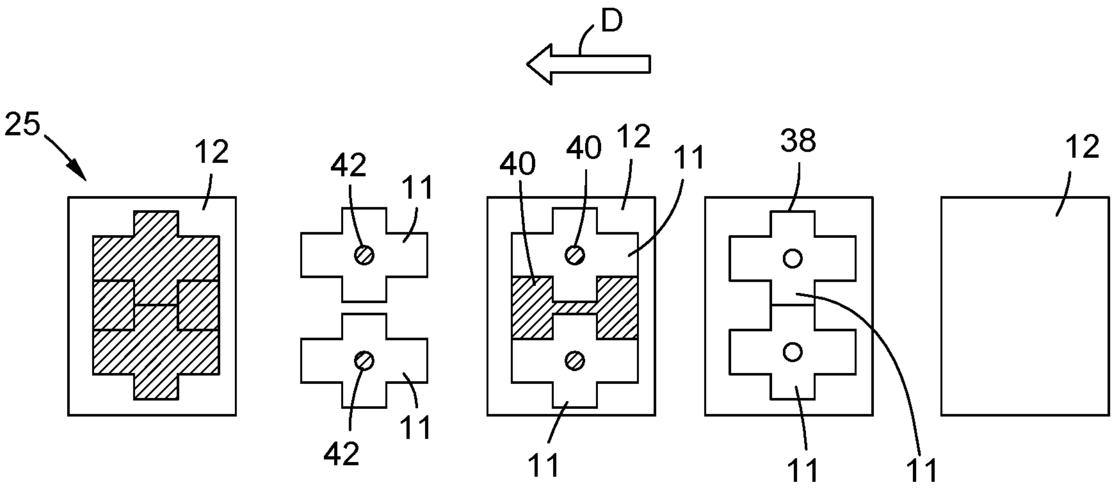
Figure 3:
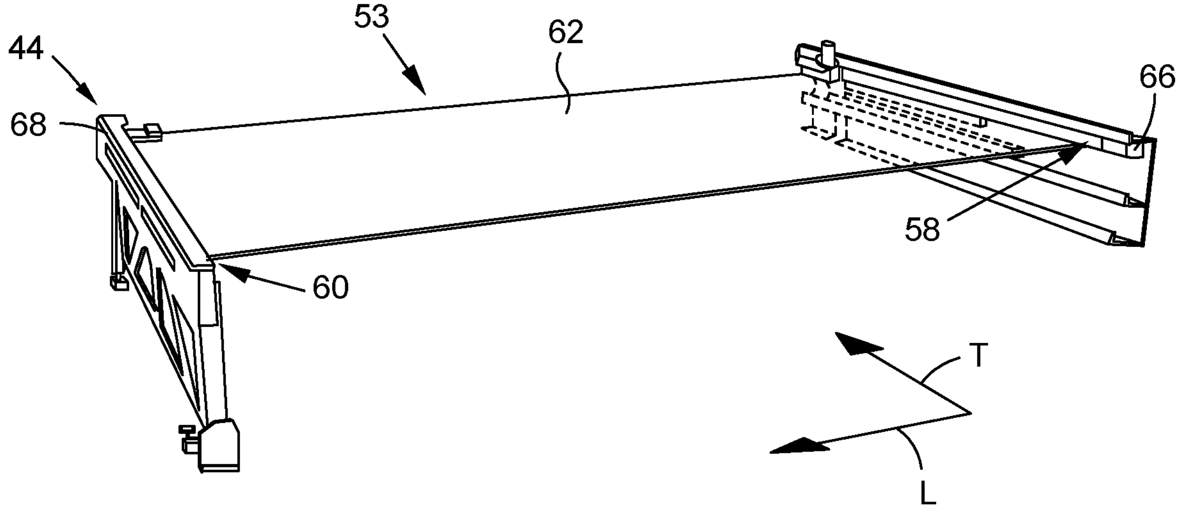
Figure 4:
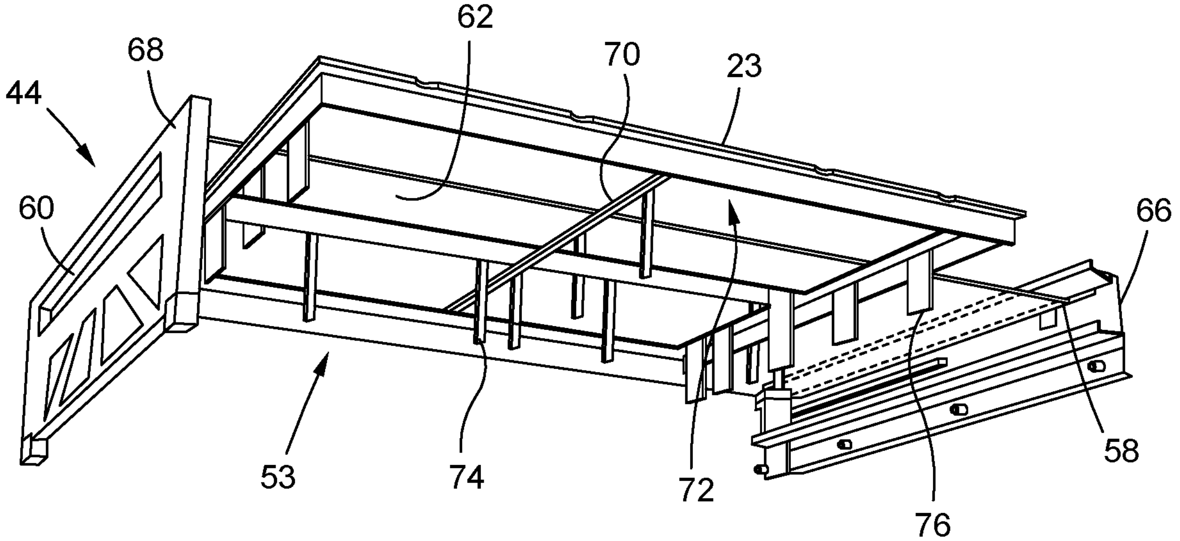
Figure 5:
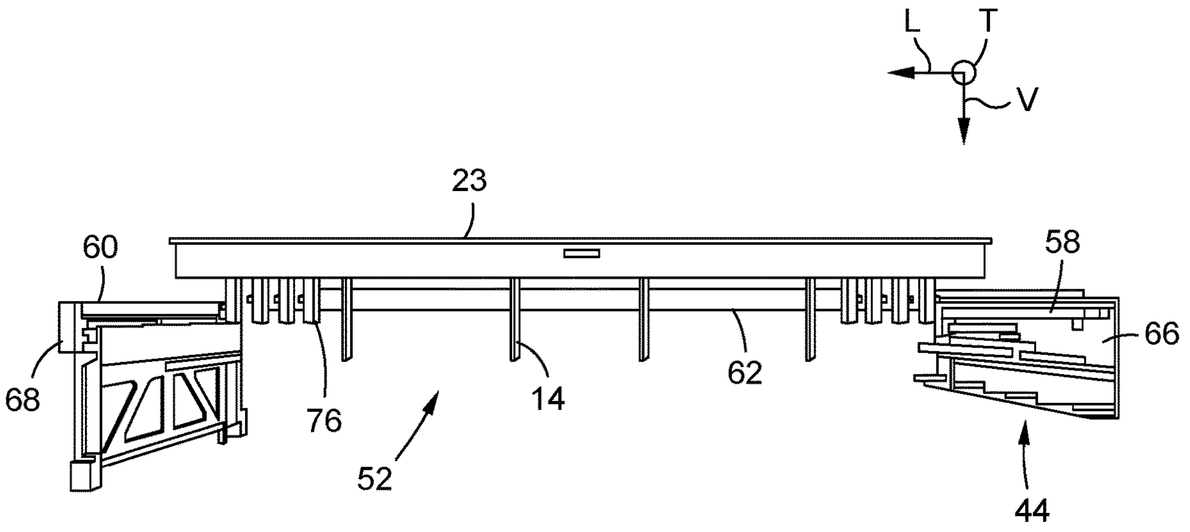
Figure 6:
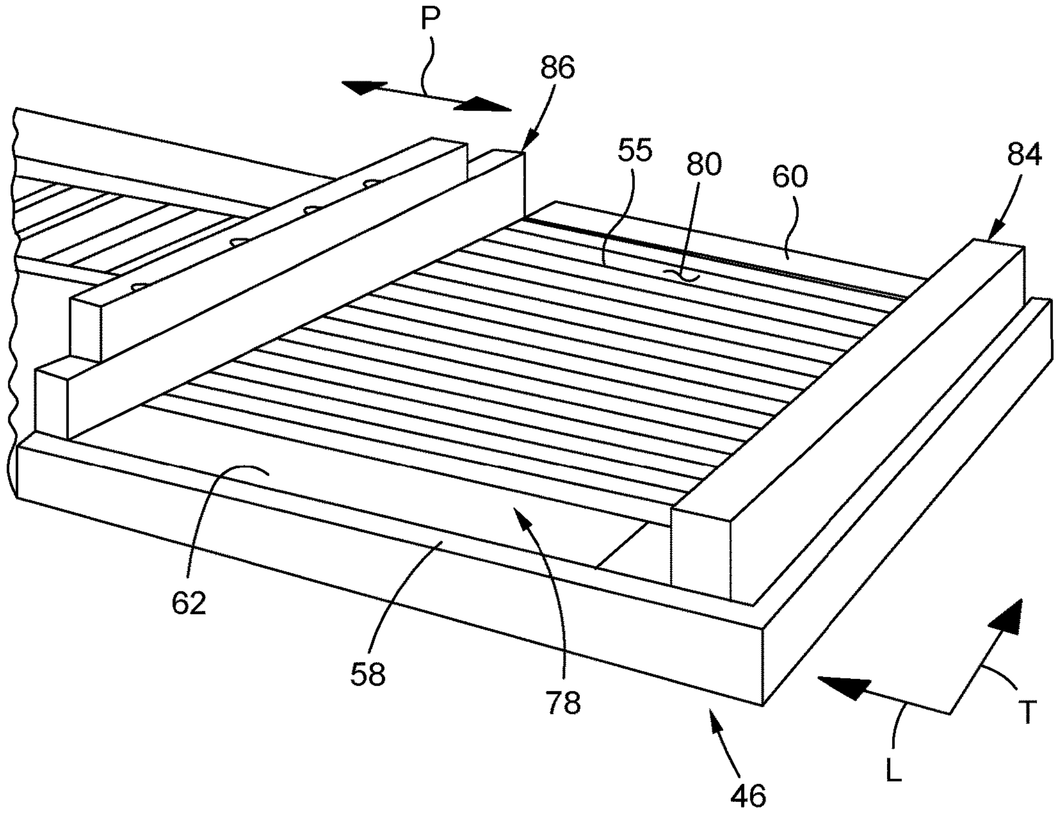

Further advantages and features of the invention will become apparent from the following description of the invention and from the appended figures which show a non-limiting exemplary embodiment of the invention and in which:

FIG. 1 schematically shows a sheet processing machine according to the invention;

FIG. 2 schematically shows top views of a sheet being processed by the sheet processing machine of FIG. 1;

FIG. 3 shows a perspective view of a jam detection device used in the sheet processing machine of FIG. 1, FIG. 4 shows another perspective view of the jam detection device of FIG. 3 with a tool arranged in a detection zone of the jam detection device, FIG. 5 shows a front view of the jam detection device of FIG. 4, and FIG. 6 shows a perspective view of another jam detection device and a rack of the sheet processing machine of FIG. 1.

FIG. 1 schematically shows a sheet processing machine 10 making it possible to cut blanks 11 (see FIG. 2) from a succession of sheets 12. These blanks 11 are usually intended to be subsequently folded and bonded to form packaging boxes. However, the sheets 12 might generally be made of e.g. paper, cardboard, foil, a composite material thereof or any other material routinely used in the packaging industry.

The sheet processing machine 10 comprises a series of processing stations that are juxtaposed but interdependent one another in order to form a unitary assembly. The processing machine 10 includes a loading station 14 followed by a cutting station 16 (also usually named punching station) comprising for example a die or platen press 18 where the sheets 12 are transformed by cutting, a waste removal station 20 wherein most of the waste parts are stripped, a blank separation station 22 (also usually named reception station) for separation of the blanks 11 (or blanking operation) by means of a blanking tool 23 and an evacuation station 24 for removing the residual waste sheets 25 (see FIG. 2) of the punched sheets 12.

The number and nature of the processing stations may vary depending on the nature and the complexity of the converting operations to be carried out on the sheets 12.

The sheet processing machine 10 also has a transfer mechanism 26, which in the shown embodiment is a conveyor, to make it possible to individually move each sheet 12 from an outlet of the loading station 14 to the evacuation station 24.

The conveyor uses a series of gripper bars 28 that are mounted so as to be moveable by means of two loops of chains 30 one placed laterally on each side of the sheet processing machine 10. Each loop of chains 30 travels around a loop which allows the gripper bars 28 to follow a trajectory passing successively by the cutting station 16, the waste removal station 20, the blank separation station 22 and the evacuation station 24.

Each gripper bar 28 travels on an outward path in a substantially horizontal plane of passage between a driven wheel 32 and an idler wheel 34, and then a return path in the top portion of the sheet processing machine 10. Once returned to the driven wheel 32, each gripper bar 28 is then able to grip a new sheet 12 at a front edge of the sheet 12.

In FIG. 1, each processing station is illustrated in the form of two rectangles symbolizing respectively its top portion and its bottom portion that are positioned on each side of the plane of movement of the sheets 12.

In FIG. 1, a transverse (or lateral), longitudinal and vertical direction are indicated by the orthogonal spatial system (T, L, V).

The terms "upstream" and "downstream" are defined with reference to the direction of movement of sheets 12 in a handling direction as illustrated by the arrow D in FIG. 1.

In FIG. 2, the current state and shape of the sheet 12 being processed by the sheet processing machine 10 (see FIG. 1) is shown, wherein the top views of the sheets 12 are arranged according to the sequence of the stations of the sheet processing machine 10 of FIG. 1.

In the loading station 14, the sheet 12 is provided as flat sheet with a rectangular or quadratic surface.

In the cutting station 16, a contour of the blanks 11 is prepared by forming weakened edges 38 in the sheet 12, e.g. by a sequence of nicks and/or perforations.

In the waste removal station 20, selected parts of the sheet 12 are cut out and are ejected from the sheet 12, as indicated with shaded areas 40 in FIG. 2.

Finally, the blanks 11 are separated from the sheet 12 in the blank separation station 22 such that two cross-shaped blanks 11 with a central opening 42 are obtained from the sheet 12 in the shown embodiment.

The rest of the sheet 12, i.e. the residual waste sheet 25, is removed in the evacuation station 24.

Of course, the sequence shown in FIG. 2 is illustrative in nature, only. Different shapes and sizes of the sheet 12 and/or of the blank 11 can be used and formed by the sheet processing machine 10, respectively, depending on the used type of sheets 12 and on the processing stations provided by the sheet processing machine 10.

Coming back to FIG. 1, the sheet processing machine 10 further comprises a first jam detection device 44 and a second jam detection device 46 in the blank separation station 22.

In principle, only a single jam detection device 44, 46 could be used. Further, the jam detection device 44 could be placed at any of the processing stations of the sheet processing machine 10, depending on which position is the most important and/or the most suited one for monitoring if a sheet 12, a blank 11 or a piece thereof is jammed.

The first jam detection device 44 and the second jam detection device 46 are connected to a control unit 48, e.g. by an Ethernet connection. However, the first and second jam detection devices 44 and 46, respectively, could also be connected to the control unit 48 by any means which provides a sufficiently fast exchange of signals between the first and second jam detection devices 44 and 46, respectively, and the control unit 48. E.g., the connection can also be established wireless, e.g. by Wi-Fi.

In principle, each of the first and second jam detection devices 44 and 46 can have their own control unit 48 associated to the respective jam detection device 44 and 46.

The control unit 48 comprises a storage module 50 for storing information about the blanking tool 23.

The first jam detection device 44 is arranged close to the blanking tool 23 such that the blanking tool 23 is partially arranged in a first detection zone 53 (see FIG. 3) of the first jam detection device 44.

The second jam detection device 46 is arranged underneath a rack 54 which in the shown embodiment is a non-stop rack. More specifically, the second jam detection device 46 is arranged underneath a series of retractable bars 55 (see also FIG. 6) of the rack 54.

The control unit 48 is further connected to a human-machine-interface 52 which in the shown embodiment is a touch-sensitive display.

By the human-machine-interface 52, a (not shown) operator of the sheet processing machine 10 can be informed on the current status of the sheet processing machine 10 and can control the operation of the sheet processing machine 10, too.

In FIG. 3, a perspective view of the first jam detection device 44 is shown.

The first jam detection device 44 comprises a first rail 58 and a second rail 60, wherein the first rail 58 comprises an integrated (i.e., not explicitly shown) light emitting element and the second rail 60 comprises an integrated (i.e., not explicitly shown) light receiving element.

The light emitting element has a multitude of light emitting sources, especially a multitude of laser emitting spots, while the light receiving element has a multitude of light receiving sensors, wherein each of the light receiving sensors is associated to one of the light emitting sources. This arrangement results in an essentially continuous light curtain 62 between the first rail 58 and the second rail 60 consisting of a multitude of individual light rays.

Further, the light curtain 62 is arranged in the first detection zone 53 of the blank separation station 22 and extends over essentially the full size of the first detection zone 53.

The first rail 58 and the second rail 60 are mounted on a first frame 66 and a second frame 68, respectively. The first and second frames 66 and 68 are mounted to the blank separation station 22.

Accordingly, the first jam detection device 44 can be retro-fitted to existing sheet processing machines 10.

Alternatively, the first and second frame 66 and 68, respectively, could also be part of the blank separation station 22 to which the first and second rails 58 and 60 are mounted.

FIG. 4 shows another perspective view of the first jam detection device 44.

In FIG. 4, the blanking tool 23 is partially arranged within the first detection zone 53 of the blank separation station 22.

The blanking tool 23 shown in FIG. 4 is a lower blanking tool, i.e. it is made of longitudinal and transverse bars 70 forming a grid. The blanks 11 can fall through spaces 72 of this grid and pile up vertically on the rack 54 (see FIG. 1).

FIG. 5 shows a front view of the first jam detection device 44 of FIG. 4.

From FIG. 5 it becomes clearer that the blanking tool 23 crosses the light curtain 62 by means of first protrusions 74 and second protrusions 76. The number and the arrangement of the first and second protrusions 74 and 76 is characteristic for the blanking tool 23 shown in FIGS. 4 and 5.

In FIG. 6, a perspective view on the second jam detection device 46 is shown.

The second jam detection device 46 essentially corresponds to the first jam detection device 44. Identical and functionally identical components are provided with the same reference numerals.

The second jam detection device 46 also comprises a first rail 58 and a second rail 60, wherein the first rail 58 comprises an integrated (i.e., not explicitly shown) light emitting element and the second rail 60 comprises an integrated (i.e., not explicitly shown) light receiving element.

The light emitting element has a multitude of light emitting sources, especially a multitude of laser emitting spots, while the light receiving element has a multitude of light receiving sensors, wherein each of the light receiving sensors is associated to one of the light emitting sources. This arrangement results in an essentially continuous light curtain 62 between the first rail 58 and the second rail 60.

Further, the light curtain 62 is arranged in a second detection zone 78 of the blank separation station 22 and extends over most of the second detection zone 78.

The second detection zone 78 is arranged underneath the rack 54, more specifically underneath a piling area 80 formed on an upper side of the retractable bars 55 of the rack 54. The retractable bars 55 are displaceable between a working position and a resting position as indicated by the double-arrow P in FIG. 6.

In FIG. 6, the working position of the retractable bars 55 is shown, i.e. the position in which the retractable bars 55 extend from a first jogger 84 to a second jogger 86 of the rack 54.

In the following, the mode of action of the first and second jam detection devices 44 and 46, respectively, is described in more detail.

During set-up of the sheet processing machine 10 for a given processing job, the operator of the sheet processing machine 10 mounts the blanking tool 23 necessary for the desired blanking operation in the blank separation station 22.

As described before, the first and second protrusions 74 and 76 (see FIGS. 4 and 5) will interrupt several of the light rays between the light emitting element and the light receiving element of the first jam detection device 44 as long as the blanking tool 23 stays mounted in the blank separation station 22.

This results in a change of the sensor signal of the light receiving sensors which are associated to the interrupted light rays. Generally, a reduction in intensity of the sensor signal to zero or to the noise level of the light receiving sensor occurs in this case.

To allow the control unit 48 to take these interrupted light rays into account, information about the tool used in the blanking separation station, i.e. about the mounted blanking tool 23, is stored in the storage module 50 of the control unit 48.

The information about the blanking tool 23 comprises a tool identifier. The tool identifier can be provided to the control unit 48 by the operator of the sheet processing machine 10 or by scanning a tag on the blanking tool 23, e.g. a (not shown) RFID tag.

Additionally, the information about the blanking tool 23 comprises a ray blocking map. The ray blocking map defines which light rays of the light curtain 62 of the first jam detection device 44 are expected to be interrupted by the first and second protrusions 74 and 76 of the blanking tool 23.

If the tool identifier of the blanking tool 23 is not already present in the storage module 50, the control unit 48 enters into a learning mode. In the learning mode, the ray blocking map of the currently installed blanking tool 23 is calculated by the control unit 48, associated to the tool identifier and stored in the storage module 50. This process is done automatically by the control unit 48, i.e. the operator of the sheet processing machine 10 does not need to provide the ray blocking map.

If the tool identifier of the blanking tool 23 is already present in the storage module 50, the control unit 48 compares the ray blocking map with the currently interrupted light rays. If any discrepancy is found, an error message is sent to the human-machine-interface 52 to inform the operator of the sheet processing machine.

If no tool identifier is provided by the blanking tool 23 at all, the control unit 48 is adapted to compare the currently interrupted light rays with the ray blocking maps stored in the storage module 50. If a matching ray blocking map is found, the associated tool identifier can be transmitted to the human-machine-interface 52 so that the operator can check whether the tool identifier is correct. If no matching ray blocking map is found, the control unit 48 generates a tool identifier, associates this tool identifier with the ray blocking map and transmits a message to the human-machine-interface 52 that a new tool has been identified.

Accordingly, during set-up of the sheet processing machine 10, the control unit 48 can automatically identify the used blanking tool 23 and the light rays of the light curtain 62 in the first detection zone 53 which are expected to be interrupted by said blanking tool 23. At the same time, any discrepancies can be reported to the operator of the sheet processing machine 10 already during set-up to avoid any error during the processing job.

As can be seen from FIG. 6, the rack 54 does not interrupt any light ray of the light curtain 62 arranged in the second detection zone 78. Accordingly, there is no need to define a ray blocking map for the second jam detection device 46. However, the control unit 48 can still generate a ray blocking map indicating that no light ray of the light curtain 62 arranged in the second detection 78 is blocked by the rack 54.

During operation of the sheet processing machine 10, the first and second jam detection devices 44 and 46 are used for monitoring that no object is jammed or stuck in the first and/or second detection zones 53 and 78, respectively.

Such objects might especially be sheets 12, blanks 11 and/or pieces thereof which e.g. are caught by the grid of the blanking tool 23 (see FIG. 4) or which have slipped between the retractable bars 55 of the rack 54 (see FIG. 6) and jammed in this position.

In case an object becomes jammed in the blank separation station 22, the whole sheet processing machine 10 must be stopped, as further operation would result in producing blanks 11 of insufficient quality. Further, parts of the blank separation station 22 might be damaged by the jammed object.

However, if an object becomes jammed in the first and/or the second detection zone 53 and 78, respectively, the light rays of the corresponding light curtain 62 at the position of the object become interrupted, resulting in a change of the sensor signal transmitted by the light receiving sensor associated to the interrupted light ray.

This change of the sensor signal is registered by the control unit 48, so that the control unit 48 can transmit a warning message to the human-machine-interface 52 to inform the operator of the sheet processing machine 10 that an object has become jammed in at least one of the detection zones 53 and 78.

The warning message preferably comprises the location of the interrupted light ray. Accordingly, the operator can stop the operation of the sheet processing machine 10 and remove the jammed object.

Generally, it is also possible that the operation of the sheet processing machine 10 is automatically stopped as soon as the control unit 48 registers an interruption of any of the light curtains 62.

Further, in the storage module 50 of the control unit 48, a minimum interruption time can be stored and the control unit 48 can be adapted to only transmit the warning message to the human-machine-interface and/or stop the operation of the sheet processing machine 10, if the interrupted light rays stay interrupted for at least the minimum interruption time. This allows for a more robust detection and minimizes the amount of false warning messages and/or unnecessary operation stops of the sheet processing machine 10

The sheet processing machine 10 according to the invention provides a simple and reliable means for detection of objects jammed in the blank separation station 22.

The invention claimed is:

1. A sheet processing machine comprising:

a jam detection device including:

a light emitting element and a light receiving element forming a light barrier in a detection zone of a processing station of the sheet processing machine, and a control unit being connected to the light receiving element and being adapted to register if the light barrier is interrupted, wherein the light barrier formed in the detection zone by the light emitting element and the light receiving element is a light curtain comprising more than one light ray, the control unit being adapted to register if one or more of the light rays is interrupted, wherein the processing station comprises a tool being at least partially arranged in the detection zone, and wherein the control unit comprises a storage module for storing information about the tool.

2. The sheet processing machine according to claim 1, wherein the light receiving element and the light emitting element are mounted on a first rail and a second rail, respectively, the first rail and the second rail especially being parallel to each other.

3. The sheet processing machine according to claim 1, wherein the detection zone is arranged underneath a rack for collecting sheets or blanks processed by the sheet processing machine.

4. The sheet processing machine according to claim 1, wherein the information about the tool comprises a ray blocking map, the ray blocking map indicating if the light barrier is interrupted by the tool, especially if one or more of the light rays are interrupted by the tool.

5. The sheet processing machine according to claim 4, wherein the information about the tool includes a tool identifier.

6. The sheet processing machine according to claim 5, wherein the control unit is adapted to automatically determine the ray blocking map of the tool if the tool identifier is not already stored in the storage module with an associated ray blocking map.

7. The sheet processing machine according to claim 4, wherein the sheet processing machine further comprises a human-machine-interface connected to the control unit.

8. The sheet processing machine according to claim 7, the control unit being adapted to transmit a warning message to the human-machine-interface if the light barrier is interrupted, especially wherein the warning message is transmitted only if the interruption of the light barrier does not correspond to the ray blocking map of the tool stored in the storage module.

9. The sheet processing machine according to claim 1, wherein the control unit is adapted to enter into a learning mode for obtaining the information about the tool.

10. The sheet processing machine according to claim 1, wherein the tool is a blanking tool.

* * * * *